(12) United States Patent
Honma et al.

(10) Patent No.: US 8,364,474 B2
(45) Date of Patent: *Jan. 29, 2013

(54) SIGNAL ENCODING DEVICE AND SIGNAL ENCODING METHOD, SIGNAL DECODING DEVICE AND SIGNAL DECODING METHOD, PROGRAM, AND RECORDING MEDIUM

(75) Inventors: Hiroyuki Honma, Chiba (JP); Toru Chinen, Kanagawa (JP)

(73) Assignee: Sony Corporation, Tokyo (JP)

( * ) Notice: Subject to any disclaimer, the term of this patent is extended or adjusted under 35 U.S.C. 154(b) by 61 days.

This patent is subject to a terminal disclaimer.

(21) Appl. No.: 13/010,981

(22) Filed: Jan. 21, 2011

(65) Prior Publication Data

US 2011/0119066 A1    May 19, 2011

Related U.S. Application Data

(63) Continuation of application No. 11/613,485, filed on Dec. 20, 2006, now Pat. No. 7,899,676.

(30) Foreign Application Priority Data

Dec. 26, 2005 (JP) ................................. 2005-372518

(51) Int. Cl.
*G10L 21/00* (2006.01)
(52) U.S. Cl. .... 704/219; 704/230; 704/500; 375/240.23
(58) Field of Classification Search .................. 704/219, 704/230, 500; 375/240.23
See application file for complete search history.

(56) References Cited

U.S. PATENT DOCUMENTS

| 5,068,899 | A | 11/1991 | Ellis et al. | |
|---|---|---|---|---|
| 5,930,750 | A | 7/1999 | Tsutsui | |
| 6,169,973 | B1 | 1/2001 | Tsutsui et al. | |
| 7,580,893 | B1 | 8/2009 | Suzuki | |
| 7,769,584 | B2 * | 8/2010 | Oshikiri et al. | 704/230 |
| 8,140,324 | B2 * | 3/2012 | Vos et al. | 704/225 |
| 2005/0004793 | A1 | 1/2005 | Ojala | |
| 2005/0149339 | A1 | 7/2005 | Tanak | |
| 2008/0052066 | A1 * | 2/2008 | Oshikiri et al. | 704/221 |
| 2009/0024395 | A1 * | 1/2009 | Banba | 704/500 |

FOREIGN PATENT DOCUMENTS

| EP | 1073038 | 1/2001 |
|---|---|---|
| JP | 02-311006 | 12/1990 |
| JP | 09-055778 | 2/1997 |
| JP | 1997 146593 | 6/1997 |
| JP | 2005-148539 | 6/2005 |
| JP | 2005 292702 | 10/2005 |
| WO | 2004027998 | 4/2004 |
| WO | 2005078706 | 8/2005 |

OTHER PUBLICATIONS

European Search Report corresponding to European Serial No. 06026703.6 dated Apr. 4, 2007.
Information Technology—Coding of Audio-Visual Objects; Part Audio (ISO/IED14495-3:2001).

* cited by examiner

*Primary Examiner* — Daniel D Abebe
(74) *Attorney, Agent, or Firm* — SNR Denton US LLP (57) ABSTRACT

A signal encoding device for encoding an input time-series signal includes: partitioning means; low-frequency encoding means; high-frequency gain information generating means; low-frequency reference value information generating means; high-frequency gain difference information generating means; high-frequency gain difference information encoding means; and multiplexing means.

8 Claims, 9 Drawing Sheets

SIGNAL ENCODING DEVICE AND SIGNAL ENCODING METHOD, SIGNAL DECODING DEVICE AND SIGNAL DECODING METHOD, PROGRAM, AND RECORDING MEDIUM

RELATED APPLICATION DATA

This application is a continuation of U.S. patent application Ser. No. 11/613,485, filed Dec. 20, 2006, the entirety of which is incorporated herein by reference to the extent permitted by law. The present application claims the benefit of priority to Japanese Patent Application JP 2005-372518 filed in the Japanese Patent Office on Dec. 26, 2005, the entirety of which is incorporated by reference herein to the extent permitted by law.

BACKGROUND OF THE INVENTION

The present invention relates to a signal encoding device and a signal encoding method, a signal decoding device and a signal decoding method, a program, and a recording medium suitably applicable to expand a time-series signal limited to a frequency band at an encoding side to wider frequency band at a decoding side.

In recent years, it has become possible to compress a tone quality corresponding to a CD (Compact Disc) in data amount of approximately ⅒ of the original CD by using a human's auditory structure in high-efficiency encoding of an audio signal. Products manufactured by using the technology are presently widespread in the market. Recording in a smaller recording medium or transmission through a network is actually performed.

In this high-efficiency compression, independent formats are respectively applied. It is possible to with any degree of freedom control the tone quality and a bit rate at an encoding side within the format range. For example, a mini disc (Mini Disc; MD) (Registered Trademark of Sony Corporation) includes two modes such as LP2 and LP4 to which a same high-efficiency compression technology is applied, as a long-time recording mode. LP4 is compressed to half the compression size with respect to LP2. Accordingly, LP4 has a deteriorated tone quality, but LP4 has a recording time twice that of the LP2.

However, the high-efficiency compression technology is designed and standardized by targeting the definite bit rate and tone quality. Therefore, when the standard (format) is maintained and the bit rate is reduced, the tone quality is drastically deteriorated. Generally, there is provided a method of distributing remained bits to a low-frequency signal by modifying a high-efficiency encoding algorithm at the encoding side and limiting a high-frequency signal so as to solve the problem.

"Information technology—Coding of audio-visual objects—Part 3: Audio (ISO/IEC 14496-3: 2001)" can be cited as a related art.

SUMMARY OF THE INVENTION

As described above, when a high-frequency signal is limited to maintain tone quality and reduce a bit rate with the format unchanged, the high-frequency signal may be reproduced at a decoding side. For example, there are provided a technology for doubling a reproduction band of a PCM (Pulse Code Modulation) signal of 44.1 kHz sampling disclosed in Japanese Patent Unexamined Publication No. 2-311006 and a technology for expanding a frequency band of a phone disclosed in Japanese Patent Unexamined Publication No. 9-55778 at a receiving side.

This technology has an advantage that the problem can be solved by modifying the only decoding side without changing the format. However, since it is necessary to expand the band of only received signal, a dramatic effect is not shown in tone quality. High-frequency auditory distortion may sing in the ears regardless of a low frequency and a high frequency depending on input sound sources.

The band may be expanded by encoding information to expand the band at the encoding side by expanding the format and by using the information to expand the band at the decoding side. For example, there are provided a technology for expanding the band by using an LPC (Linear Predictive Coding) filter disclosed in U.S. Pat. No. 5,068,899 and a technology for expanding the band by using a subband filter bank and a nonlinear device disclosed in U.S. Pat. No. 5,127,054.

When this technology is used, an improvement effect can be obtained with respect to a sound signal. However, since the auditory distortion sings in the ears, a good quality cannot be obtained with respect to an audio signal. On the contrary, the good quality can be obtained with respect to the audio signal by using another technology to some extent. For example, the good quality can be, to some extent, obtained with respect to the audio signal in ISO standard HE-AAC (ISO/IEC 14496-3: 2001) to some extent.

Figure 10:
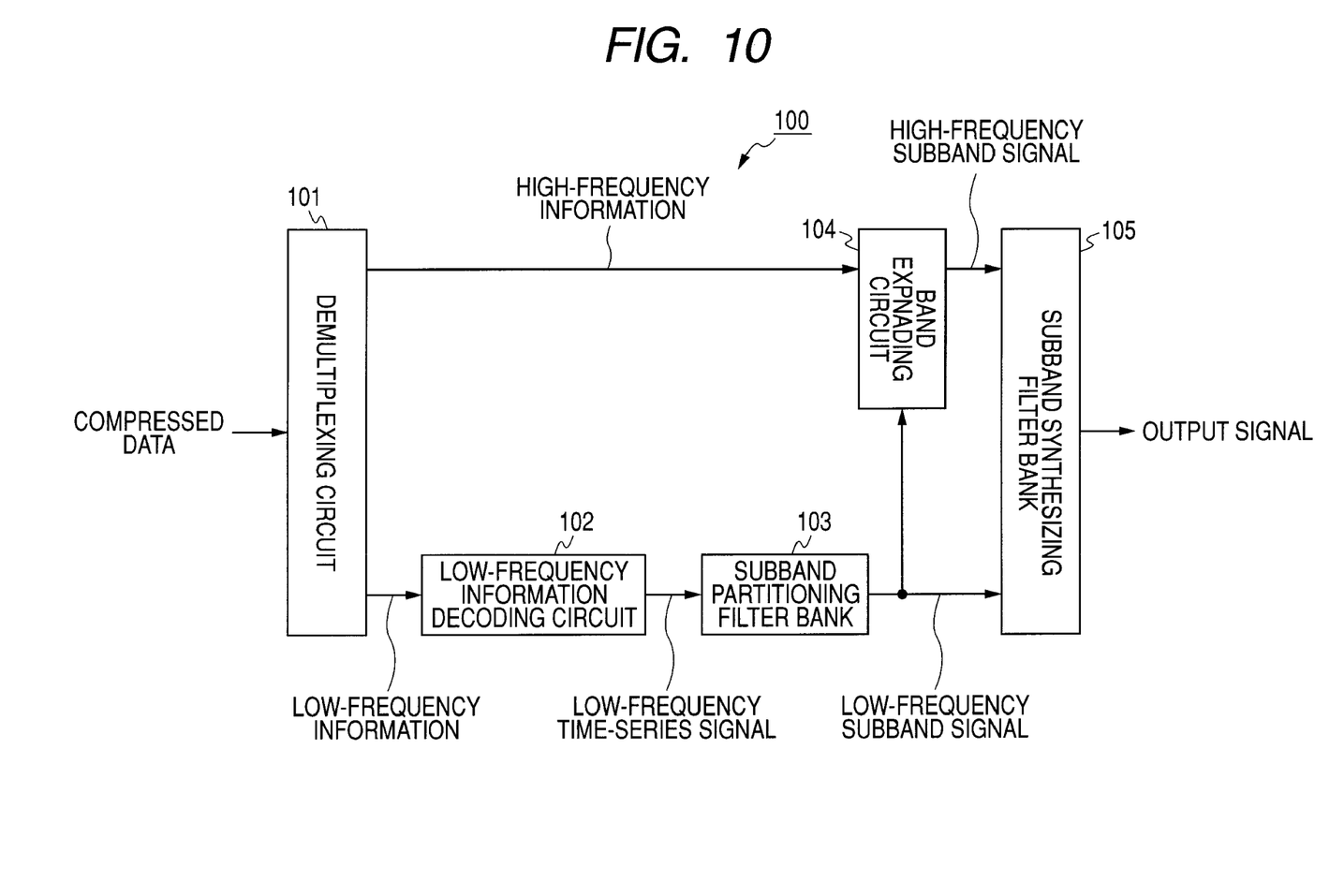
FIG. 10 shows an example of the configuration of a single decoding device which performs a band expansion by HE-AAC.

FIG. 10 shows an example of a configuration of a signal decoding device which performs a band expanding operation by HE-AAC. In a signal decoding device 100 shown in FIG. 10, a demultiplexing circuit 101 divides compressed data output from a signal encoding device into low-frequency information and high-frequency information, and provides the low-frequency information and the high-frequency information to a low-frequency information decoding circuit 102 and a band expanding circuit 104, respectively.

The low-frequency information decoding circuit 102 decodes the low-frequency information, generates low-frequency time-series signal, and provides the low-frequency time-series signal to a subband partitioning filter bank 103.

The subband partitioning filter bank 103 partitions the low-frequency time-series signal into plural bands (subbands), generate, and provides the low-frequency subband signal to the high-frequency expanding circuit 104 and a subband synthesizing filter bank 105.

The band expanding circuit 104 generates the high subband signal by using the high-frequency information and expands the band. More specifically, the high-frequency information includes the gain value of the high-frequency subband signal and the band expanding circuit 104 controls the gain of the high-frequency subband signal generated from the low-frequency subband signal by using the high-frequency information. Then, the band expanding circuit 104 provides the generated high-frequency subband signal to the subband synthesizing filter bank 105.

The subband synthesizing filter bank 105 synthesizes the low-frequency subband signal and the high-frequency subband signal, and generates the time-series signal as an output signal.

The above-mentioned high-frequency information is the gain value of the high-frequency subband signal. The gain value is acquired by each short-time sector (subframe) of the subband signal in the signal encoding device. Moreover, a difference value of the gain value is acquired in a frequency direction or in a time direction to improve an encoding efficiency. Therefore, any one of both directions can be selected by frames. For example, when the frequency direction is selected as a difference value acquiring direction in a frame, the difference value with the gain value of a subband at a low-frequency side adjacent to a low frequency from a high frequency is acquired. As a result, since there is not provided a subband at the adjacent low-frequency side with respect to a first high-frequency subband which has a lowest frequency in the high-frequency subband signal, the gain value is the absolute value, but the gain value is the difference value after a second high-frequency subband. On the contrary, when the time direction is selected as the difference value acquiring direction, the gain value of each subband is the difference value from the gain value of a preceding time sector. Accordingly, the gain value of an optional initial time sector is the difference value from a final time sector of a preceding frame.

In the signal encoding device, the difference value acquiring direction is selected in consideration of a deflection of a time frequency signal by using the method. When the difference value is acquired, a code amount can decrease by using a variable-length code to reduce the deflection of the gain value.

However, when the frequency direction is selected as the difference value acquiring value, the gain value of the first high-frequency subband which has the lowest frequency in the high-frequency subband signal is the absolute value. Therefore, the code amount of the frame increases. When the time direction is selected as the difference value acquiring direction, it is difficult to treat an editing operation of the compressed data (bit stream) or a missing of information on a transmission line.

In the above circumstance, it is desirable that the invention provides a signal encoding device and a signal encoding method capable of effectively transmitting gain information of a high-frequency signal included in characteristic information of a high-frequency signal, a signal decoding device and a signal decoding method decoding compressed data output from the signal encoding device, and a program executing the signal encoding process and the signal decoding in a computer and a computer-readable recording medium in which the program is recorded.

According to a first embodiment of the invention, a signal encoding device for encoding an input time-series signal includes partitioning means for partitioning the time-series signal into plural subbands to generate a low-frequency subband signal including plural low-frequency subbands and a high-frequency subband signal including plural high-frequency subbands; low-frequency encoding means for quantizing and encoding the low-frequency subband signal to generate low-frequency encoding data; high-frequency gain information generating means for generating high-frequency gain information by generating a new high-frequency subband signal from the low-frequency subband signal and comparing the gain of the new high-frequency subband signal and the gain of the high-frequency subband signal of each subband at a predetermined time interval; low-frequency reference value information generating means for generating low-frequency reference value information on the basis of at least the low-frequency subband signal; high-frequency gain difference information generating means for generating high-frequency gain difference information by acquiring a difference value between the high-frequency gain information generated in each subband at a predetermined time interval and high-frequency gain information at a time position corresponding to an adjacent low-frequency subband, and acquiring a difference value between high-frequency gain information of a lowest-frequency subband in the high-frequency subband signal and the low-frequency reference value information; high-frequency gain difference information encoding means for quantizing and encoding the high-frequency gain difference information to generate high-frequency gain difference information encoding data; and multiplexing means for multiplexing at least the low-frequency encoding data and the high-frequency gain difference information encoding data to output the multiplexed data as compressed data.

According to a second embodiment of the invention, a signal encoding method of encoding an input time-series signal includes the steps of partitioning the time-series signal into plural subbands and generating a low-frequency subband signal including plural low-frequency subbands and a high-frequency subband signal including plural high-frequency subbands; quantizing and encoding the low-frequency subband signal to generate low-frequency encoding data; generating high-frequency gain information by generating a new high-frequency subband signal from the low-frequency subband signal and comparing the gain of the new high-frequency subband signal and the gain of the high-frequency subband signal of each subband at a predetermined time interval; generating low-frequency reference value information on the basis of at least the low-frequency subband signal; generating high-frequency gain difference information by acquiring a difference value between the high-frequency gain information generated in each subband at a predetermined time interval and high-frequency gain information at a time position corresponding to an adjacent low-frequency subband, and acquiring a difference value between a high-frequency gain information of a lowest-frequency subband in the high-frequency subband signal and the low-frequency reference value information; quantizing and encoding the high-frequency gain difference information to generate high-frequency gain difference information encoding data; and multiplexing at least the low-frequency encoding data and the high-frequency gain difference information encoding data to output the multiplexed data as compressed data.

According to a third embodiment of the invention, a signal decoding device for decoding input compressed data includes demultiplexing means for demultiplexing the compressed data to generate low-frequency encoding data and high-frequency gain difference encoding data; low-frequency decoding means for decoding and unquantizing the low-frequency encoding data to generate low-frequency subband signal; low-frequency reference value information generating means for generating low-frequency reference value information on the basis of at least the low-frequency subband signal; high-frequency gain difference information generating means for generating high-frequency gain difference information of each subband at a predetermined time interval by decoding and unquantizing the high-frequency gain difference information encoding data; high-frequency gain information generating means for generating high-frequency gain information on the basis of high-frequency gain difference information at a time position corresponding to an adjacent low-frequency subband and generating high-frequency gain information on the basis of the low-frequency reference value information in a lowest-frequency subband out of the high-frequency subband signals; high-frequency generating means for generating the high-frequency subband signal from the low-frequency subband signal and controlling the gain of the high-frequency subband signal on the basis of the high-frequency gain information; and synthesizing means for synthesizing the low-frequency subband signal and the high-frequency subband signal having a controlled gain to output the synthesized signals as a time-series signal.

According to a fourth embodiment of the invention, a signal decoding method of decoding input compressed data includes the steps of demultiplexing the compressed data to generate low-frequency encoding data and high-frequency gain difference encoding data; decoding and unquantizing the low-frequency encoding data to generate low-frequency subband signal; generating low-frequency reference value information on the basis of at least the low-frequency subband signal; generating high-frequency gain difference information of each subband at a predetermined time interval by decoding and unquantizing the high-frequency gain difference information encoding data; generating high-frequency gain information on the basis of high-frequency gain difference information at a time position corresponding to an adjacent low-frequency subband and generating high-frequency gain information on the basis of the low-frequency reference value information of a lowest-frequency subband in the high-frequency subband signal; generating the high-frequency subband signal from the low-frequency subband signal and controlling the gain of the high-frequency subband signal on the basis of the high-frequency gain information; and synthesizing the low-frequency subband signal and the high-frequency subband signal having a controlled gain to output the synthesized signals as a time-series signal.

According to a fifth embodiment of the invention, a program executes the signal encoding process or the signal decoding process described above in the computer. According to a sixth embodiment of the invention, a recording medium is readable in the computer in which the program is recorded.

According to an embodiment of the invention, when a difference value between high-frequency gain information generated of each subband at a predetermined time and the high-frequency gain information at a time position corresponding to an adjacent low-frequency subband, there is acquired the difference value between the high-frequency gain information of a lowest-frequency subband in a high-frequency subband signal and low-frequency reference value information generated on the basis of a low-frequency subband signal. Therefore, a code amount of the high-frequency gain information decreases, thereby improving an encoding efficiency.

DETAILED DESCRIPTION OF THE PRESENTLY PREFERRED EMBODIMENTS

Hereinafter, detailed embodiments of the invention will be described with reference to the accompanying drawings.

Figure 1:
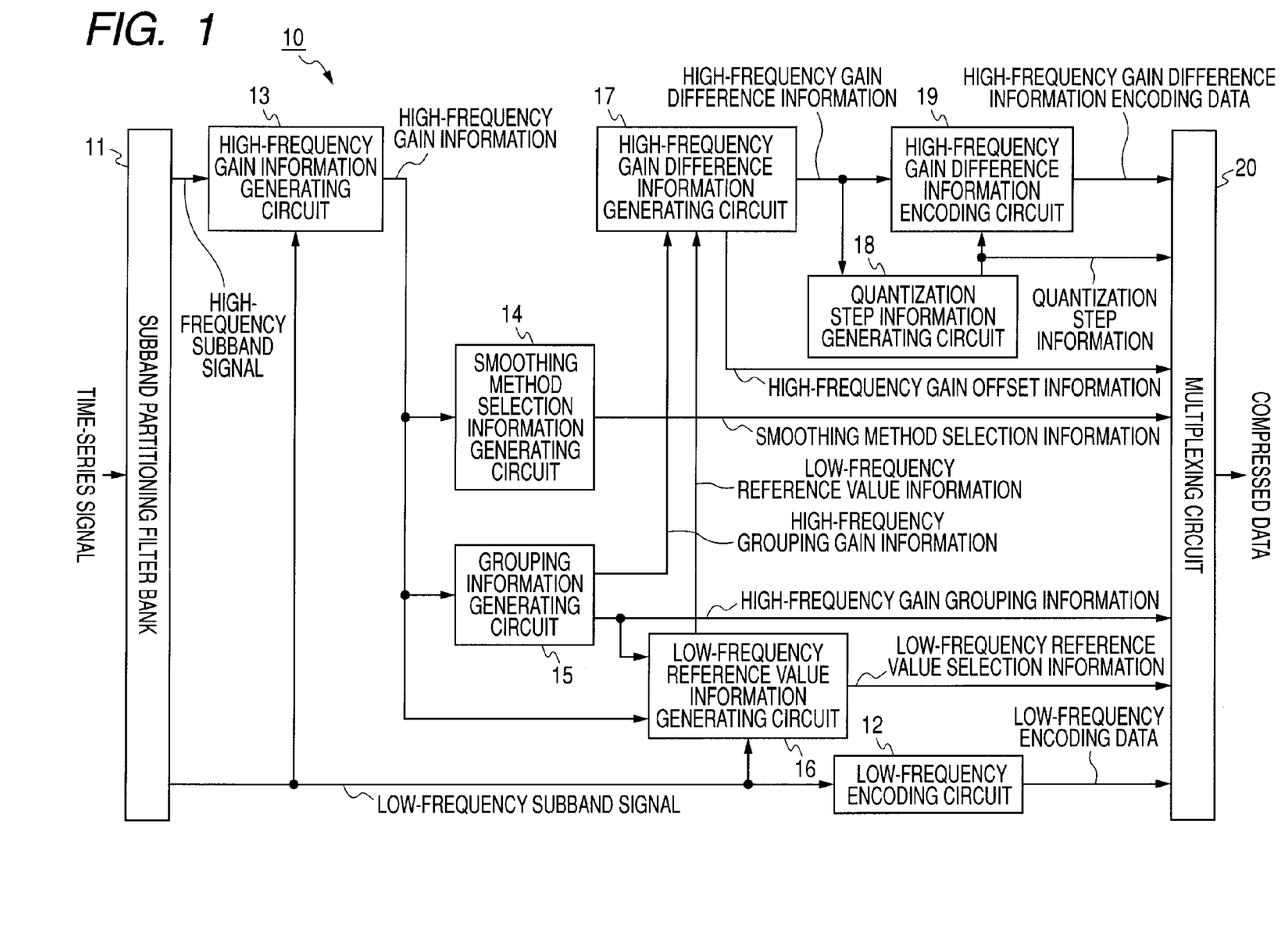
FIG. 1 is a schematic view of a signal encoding device according to an embodiment of the invention.

First, FIG. 1 is a schematic view of a signal encoding device according to an embodiment of the invention. As shown in FIG. 1, a signal encoding device 10 in this embodiment of the invention includes a subband partitioning filter bank 11, a low-frequency encoding circuit 12, a high-frequency gain information generating circuit 13, a smoothing method selection information generating circuit 14, a grouping information generating circuit 15, a low-frequency reference value information generating circuit 16, a high-frequency gain difference information generating circuit 17, a quantization step information generating circuit 18, a high-frequency gain difference information encoding circuit 19, and a multiplexing circuit 20.

The subband partitioning filter bank 11 partitions an input time-series signal into plural subbands, and provides a low-frequency subband signal including plural low-frequency subbands to the low-frequency encoding circuit 12, the high-frequency gain information generating circuit 13, and the low-frequency reference value information generating circuit 16. In addition, the subband partitioning filter bank 11 provides high-frequency subband signal including plural high-frequency subbands to the high-frequency gain information generating circuit 13.

Herein, the subband signal is represented in $x(k, n)$ ($k=0, 1, 2, \ldots N-1$). k represents a subband index and N represents the number of partitioned subbands. In addition, n represents a time index. When the subband at $k=0$ is a lowest-frequency subband and the subband at $k=N-1$ is the highest-frequency subband, the entire subband signal at $k=0, 1, \ldots, N/2-1$ is the low-frequency subband signal and the entire subband signal at $k=N/2, N/2+1, \ldots, N-1$ is the high-frequency subband signal in the subband partitioning filter bank 11.

In this embodiment, the number of the subbands is N/2 at both a low-frequency side and a high-frequency side, but the ratio of the number of the low-frequency subbands and the number of high-frequency subbands can be optionally set and the numbers of both subbands need not be the same.

The low-frequency encoding circuit 12 quantizes and encodes the low-frequency subband signal, and provides low-frequency encoding data to the multiplexing circuit 20.

The high-frequency gain information generating circuit 13 calculates an average gain value by short-time sector (subframes) with respect to the high-frequency subband signal and generates high-frequency gain information. The high-frequency gain information generating circuit 13 provides the generated high-frequency gain information to the smoothing method selection information generating circuit 14, the grouping information generating circuit 15, and the low-frequency reference value information generating circuit 16.

Hereinafter, a method of generating the high-frequency gain information by using the high-frequency gain information generating circuit 13 will be described.

Herein, in this embodiment, for example, expanding the band at a decoding side is performed by using a frequency aliasing method disclosed in U.S. Pat. No. 5,068,899. In this frequency aliasing method, the low-frequency subband signal is reversed in frequency at the decoding side to generate the high-frequency subband signal. That is, when the low-frequency subband signal at the decoding side is x'(k, n) (k=0, 1, . . . , N/2−1) and the high-frequency subband signal generated from the low-frequency subband signal is xa(i, n) (i=N−k−1), x'(k, n) and xa(i, n) have the relation shown in Equation (1).

$$xa(i, n) = x'(k, n) \ (i = N-k-1, k = 0, 1, 2 \ldots, N/2-1) \qquad (1)$$

The low-frequency subband signal x'(k, n) shown in Equation (1) includes a quantization error caused by the low-frequency encoding circuit 12 with respect to the original low-frequency subband signal x(k, n) at the encoding side.

Figure 2:
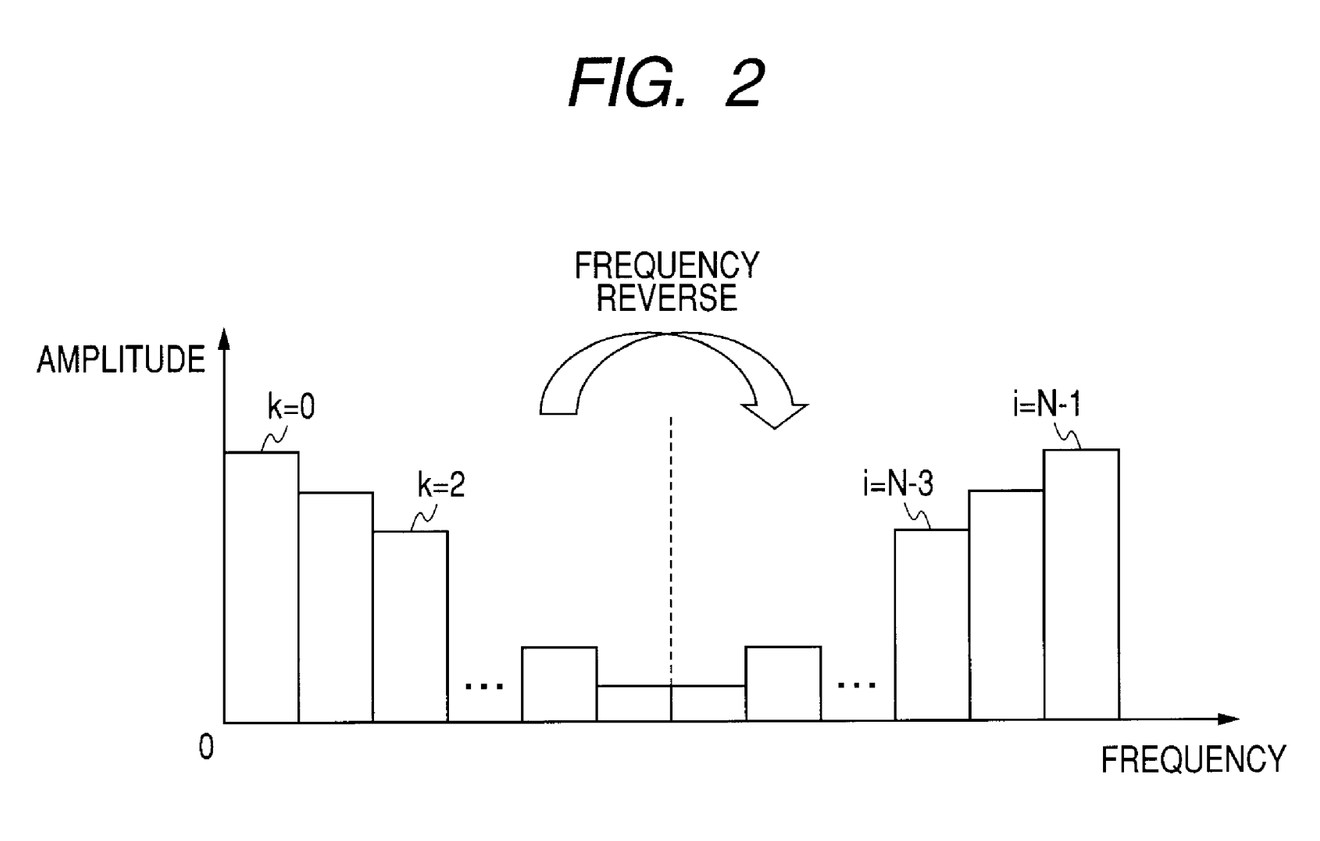
FIG. 2 is a graph showing a band expansion by using a frequency aliasing method.

FIG. 2 is a graph showing a band expansion by the frequency aliasing method. As shown in FIG. 2, the subband signal reverses in N/2$^{th}$ subband in case of using the frequency aliasing method. Therefore, for example, the low-frequency subband signal at k=0 becomes the high-frequency subband signal at i=N−1 and the low-frequency subband signal at k=2 becomes the high-frequency subband signal at i=N−3.

At a decoder, the high-frequency subband signal xa(i, n) is generated from the low-frequency x'(k, n) (k=0, 1, . . . , N/2−1). The original high-frequency subband signal x(k, n) (k=N/2, N/2+1, . . . , N−1) at tan encoder and xa(i, n) generated according to Equation (1) described above have a different gain in each subband.

Accordingly, at the decoder, it is necessary to control the gain of the high-frequency subband signal xa(i, n) having an expanded band according to Equations (2) and (3) shown below.

$$xag(i, n) = g(i) * xa(i, n) \qquad (2)$$
$$(i = N/2, N/2+1, N/2+2, \ldots, N-1)$$

$$g(i) = sqrt\left(eh(i) * B \Big/ \sum_{n=b}^{b+B} xa(i, n)^{\wedge}2\right) \qquad (3)$$
$$(i = N-k-1, \ k = 0, 1, 2, \ldots, N/2-1)$$

In Equation (3), B represents a sample period and g(i) represents a gain control value in a subframe of the sample period B from a sample b. In addition, eh(i) represents high-frequency gain information in the subframe of the sample period B from the sample b. eh(i) is calculated at the encoder and is acquired on the basis of information transmitted to the decoder. The above-mentioned high-frequency gain information generating circuit 13 generates the high-frequency gain information eh(i) from the high-frequency subband signal according to Equation (4) shown below, and supplying the generated the generated high-frequency gain information eh(i) to the selection information generating circuit 14, the grouping information generating circuit 15 and the low-frequency reference value information generating circuit 16.

$$eh(i) = 1/B \sum_{n=b}^{b+B} x(i, n)^{\wedge}2 \qquad (4)$$
$$(i = N-k-1, \ k = 0, 1, 2, \ldots, N/2-1)$$

However, since the high-frequency gain information accounts for large ratio in the low-frequency encoding data out of the compressed data output from the multiplexing circuit 20 of the signal encoding device 10, it is important to minimize the deterioration of the tone quality and reduce an information amount.

Therefore, in the signal encoding device 10 of this embodiment, the amount of the high-frequency gain information is reduced by using methods (a) to (c) as described below.

(a) In the grouping information generating circuit 15, the sample period B is variable when the high-frequency gain information is acquired according to Equation (3).

(b) In the high-frequency gain difference generating circuit 17, a difference value with the high-frequency gain information is acquired in a frequency direction of a low frequency to a high frequency, specifically, at a time position corresponding to an adjacent low-frequency subband with respect to the high-frequency gain information acquired by each subband and by each subframe. Low-frequency subbands adjacent to the lowest-frequency subbands in the high-frequency subband signal is not provided, but the difference value with a low-frequency reference value acquired from the low-frequency subband signal is acquired in the low-frequency reference value information generating circuit 16 to prevent an absolute value from being generated.

(c) In the high-frequency gain difference information encoding circuit 19, the difference value of the high-frequency gain information is quantized by a quantization step value generated in the quantization step information generating circuit 18 and the quantized difference value is encoded by using a fixed-length code or a variable-length code.

Referring back to FIG. 1, the smoothing method selection information generating circuit 14 generates the smoothing method selection information on the basis of the high-frequency gain information and provides the generated smoothing method selection information to the multiplexing circuit 20. Smoothing is not performed at the encoder, but is performed at the decoder on the basis of the smoothing method selection information. The smoothing method selection information includes information about smoothing or not. In addition, the smoothing method selection information further includes information a smoothing function (for example, a sinewave or a linear function) used at the time of performing the smoothing. For example, when discontinuity points increase in the high-frequency subband signal in which the band is expanded at the decoder, the smoothing in the time direction is performed by using the sinewave, that is, the smoothing method can be adaptively selected by frames.

The grouping information generating circuit 15 determines the sample period in which the above-mentioned high-frequency gain information is acquired. More specifically, the grouping information generating circuit 15 groups a steady part with a timely change of the high-frequency gain information, and calculates the high-frequency gain information of each group again. Grouping information determined therein is the high-frequency gain grouping information and the high-frequency gain information calculated by each group is the high-frequency grouping gain information. The grouping information generating circuit 15 provides the high-frequency grouping gain information to the high-frequency gain difference information generating circuit 17 and provides the high-frequency gain grouping information to the low-frequency reference value information generating circuit 16 and the multiplexing circuit 20.

Figure 3:
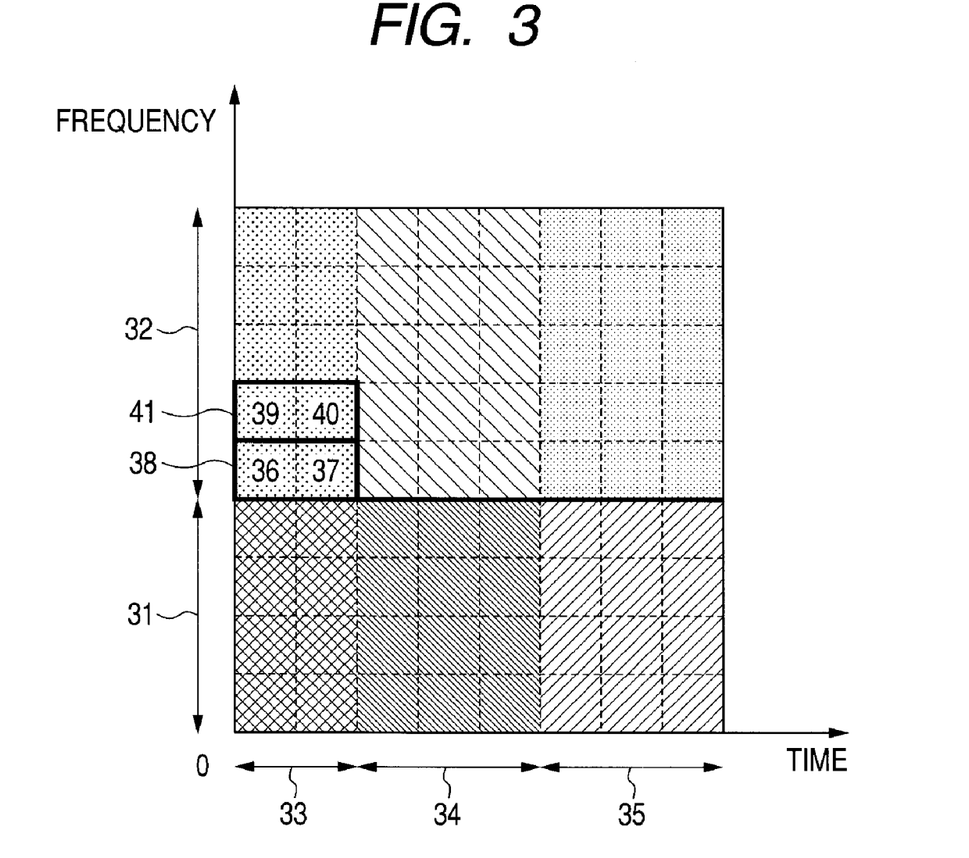
FIG. 3 shows an example of the grouping of high-frequency subband signal gain information in a grouping information generating circuit of a signal encoding device.

FIG. 3 shows an example of the grouping of the high-frequency gain information in the grouping information generating circuit 15. In addition, FIG. 3 shows the high-frequency gain information in each subframe and in each subband of the frame at the time of analyzing the subband signal. Each frequency band at a longitudinal axis represents the subband. In FIG. 3, four subbands at the low-frequency side constitute a low-frequency subband 31 and five subbands at the high-frequency side constitute a high-frequency subband 32. However, this example may not be applied. Hereinafter, the lowest-frequency subband out of the high-frequency subbands 31 is called a first high-frequency subband. As the frequency increase, the high-frequency subbands are called a second high-frequency subband and a third high-frequency subband. Each time sector at a horizontal axis represents the subframe. In FIG. 3, the subframe is grouped by two subframes, three subframes, and three subframes. The groups are called a first group 33, a second group 34, and a third group 35, respectively.

In the grouping information generating circuit 15, the high-frequency gain information 36 of the first subframe and the high-frequency gain information 37 of the second subframe in the first high-frequency subband are grouped and recalculated. Therefore, the grouped and recalculated high-frequency gain information become one high-frequency grouping gain information 38. Similarly, the high-frequency gain information 39 of the first subframe and the high-frequency gain information 40 of the second subframe in the second high-frequency subband are grouped and recalculated. Therefore, the grouped and recalculated high-frequency gain information become one high-frequency grouping gain information 41.

As described above, this grouping is generally performed in consideration of the timely steadiness of the high-frequency subband signal. For example, with respect to eh(i) acquired in Equation (4), an average value of the entire high-frequency subband of each subframe is acquired. Then, when a difference between the subframes is within a threshold value, the grouping is performed.

In FIG. 3, grouping the high-frequency gain information in the first high-frequency subband and the second high-frequency subband is performed on the basis of a same high-frequency gain grouping information. However, different high-frequency gain grouping information may be used by plural subbands.

In the example described above, the high-frequency gain grouping information is determined from the only high-frequency gain information. However, the high-frequency gain grouping information may be determined by using the low-frequency subband signal, for example, by adding a gain control amount shown in Equation (3).

Referring back to FIG. 1, the low-frequency reference value information generating circuit 16 generates the low-frequency reference value information on the basis of the high-frequency gain information, the high-frequency gain grouping information, and the low-frequency subband signal. Then, in the low-frequency reference value information generating circuit 16, a method of generating the low-frequency reference value information can be adaptively selected as described below. The low-frequency reference value information generating circuit 16 provides the low-frequency reference value information to the high-frequency gain difference information generating circuit 17 and provides the low-frequency reference value selection information representing a method of generating the selected low-frequency reference value information to the multiplexing circuit 20.

The high-frequency gain difference information generating circuit 17 acquires a difference value in a frequency direction of the high-frequency grouping gain information and generates the high-frequency gain difference information. Then, the high-frequency gain difference information generating circuit 17 acquires the difference value with the low-frequency reference value with respect to the high-frequency grouping gain information in the first high-frequency subband. The high-frequency gain difference information generating circuit 17 generates high-frequency gain offset information as necessary. The high-frequency gain difference information generating circuit 17 provides the high-frequency gain difference information to the quantization step information generating circuit 18 and the high-frequency gain difference information encoding circuit 19. In addition, the high-frequency gain difference information generating circuit 17 provides the high-frequency gain offset information to the multiplexing circuit 20.

Detailed process in the low-frequency reference value information generating circuit 16 and the high-frequency gain difference information generating circuit 17 will be described below.

The quantization step information generating circuit 18 generates quantization step information on the basis of the high-frequency gain difference information and provides the generated quantization step information to the high-frequency gain difference information encoding circuit 19 and the multiplexing circuit 20.

The high-frequency gain difference information encoding circuit 19 quantizes and encodes the high-frequency gain difference information on the basis of the quantization step information, and generates high-frequency gain difference information encoding data. The high-frequency gain difference information encoding circuit 19 provides the high-frequency gain difference information encoding data to the multiplexing circuit 20.

The multiplexing circuit 20 multiplexes the low-frequency encoding data, the low-frequency reference value selection information, the high-frequency gain grouping information, the smoothing method selection information, the quantization step information, and the high-frequency gain difference information encoding data. In addition, the multiplexing circuit 20 multiplexes the high-frequency gain offset information as necessary, and generates and output the compressed data.

Herein, the process in the above-mentioned low-frequency reference value information generating circuit 16 and the high-frequency gain difference information generating 17 will be specifically described.

Figure 4:
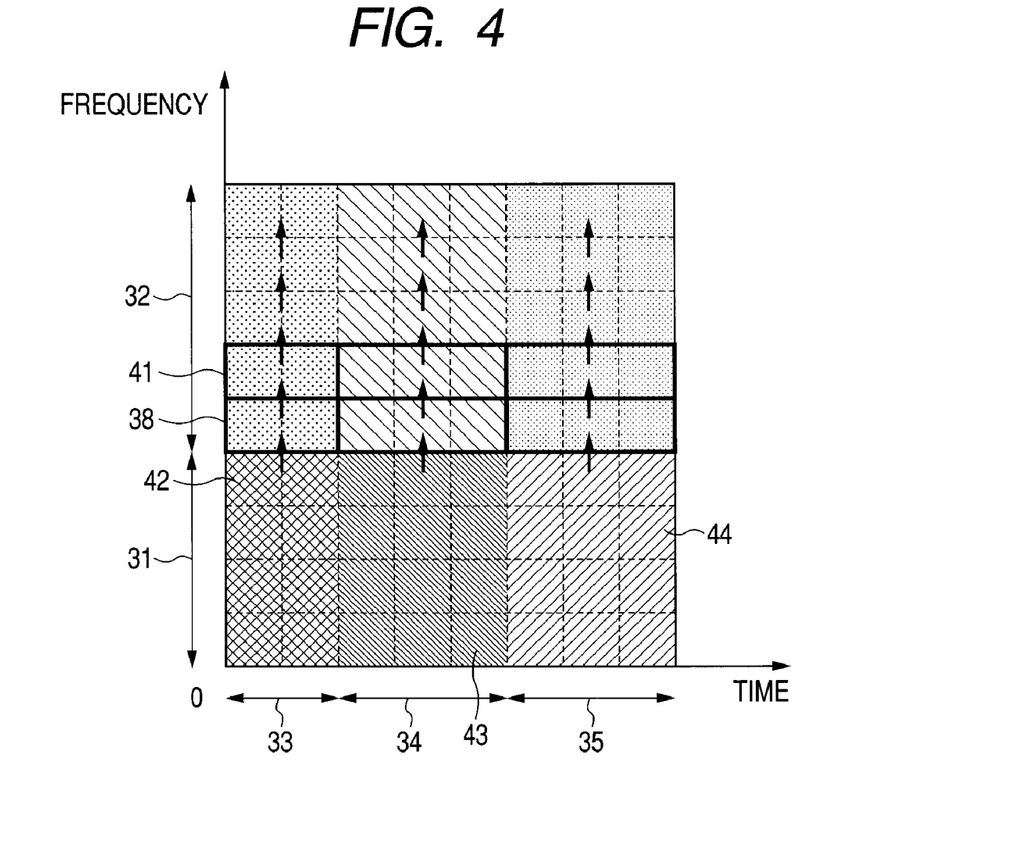
FIG. 4 shows an example of a method of acquiring low-frequency reference value information generated from a reference value information generating circuit of a signal encoding device and a difference in a high-frequency subband signal gain difference information generating circuit.

FIG. 4 shows an example of a method of acquiring the low-frequency reference value information generated by the low-frequency reference value information generating circuit 16 and the difference value in the high-frequency gain difference information generating circuit 17. In addition, FIG. 4 shows the high-frequency grouping gain information in each subframe and in each subband of a frame. Similar to FIG. 3, In FIG. 3, four subbands at the low-frequency side constitute the low-frequency subband 31 and five subbands at the high-frequency side constitute the high-frequency subband 32. Similar to FIG. 3, the information is grouped by the first group 33, the second group 34, and the third group 35, respectively.

As described above, in the low-frequency reference value information generating circuit 16, a method of generating the low-frequency reference value information can be selected.

FIG. 4 shows an example calculating the low-frequency reference value information of each group. That is, in the first group 33, low-frequency reference value information 42 is calculated from the low-frequency subband signal including four subbands and two subframes. Similarly, low-frequency reference value information 43 is calculated in the second group 34 and low-frequency reference value information 44 is calculated in the second group 35. The low-frequency reference value information can be calculated according to, for example, Equation (5) shown below.

$$lowabs = 1/(sb-1)*(1/C)\sum_{i=0}^{sb-1}\sum_{n=b}^{b+C}x(i,n)^{\wedge}2 \qquad (5)$$

lowabs shown in Equation (5) represents the low-frequency reference value. sb represents the first high-frequency subband and sb−1 represents the highest-frequency subband in the low-frequency subband signal. C represents a time period determined by the high-frequency gain grouping information, for example, the time period corresponding to two subframes in the first group 33.

The method of calculating the low-frequency reference value information of each group is not limited to Equation (5) shown above and a same calculating method may be used at both the encoder and the decoder. For example, as shown in Equation (6), the low-frequency reference value information may be calculated from the highest-frequency subband sb−1 in the low-frequency subband signal.

$$lowabs = (1/C)\sum_{n=b}^{b+C}x(sb-1,n)^{\wedge}2 \qquad (6)$$

Since the relativity of the gain value between the subband sb−1 and the subband sb is comparatively high in the calculating method shown in Equation (6), the calculating method is suitable for acquiring the difference value in the high-frequency gain difference information generating circuit 17. However, since the low-frequency reference value information of the encoder and the low-frequency reference value information of the decoder may be different due to the influence a quantization error of the low-frequency subband signal, the calculating method is suitable for assigning sufficient amount of bits at the time of encoding the low-frequency subband signal.

In the calculating method in Equation (5) shown above, since a variation of the low-frequency reference value caused by the influence of the quantization error decreases compared in the case of that in Equation (6), but an audio signal generally as a power as large as the low-frequency subband, the high-frequency gain difference information in the subband sb increases. In this case, when the difference is acquired through the high-frequency gain offset information common to all groups at the time of calculating the difference value, the encoding efficiency is improved. The high-frequency gain offset information will be specifically in the description of the high-frequency gain difference information generating circuit 17.

The high-frequency gain difference information generating circuit 17 generates the high-frequency gain difference information by each group.

In FIG. 4, first, the high-frequency gain information 38 in the first group of the first high-frequency subband is subtracted from the low-frequency reference value information 42 of the first group 33 and becomes the high-frequency gain difference information. Similarly, the high-frequency gain difference information is calculated in the second group 34 and the third group 35.

Figure 5:
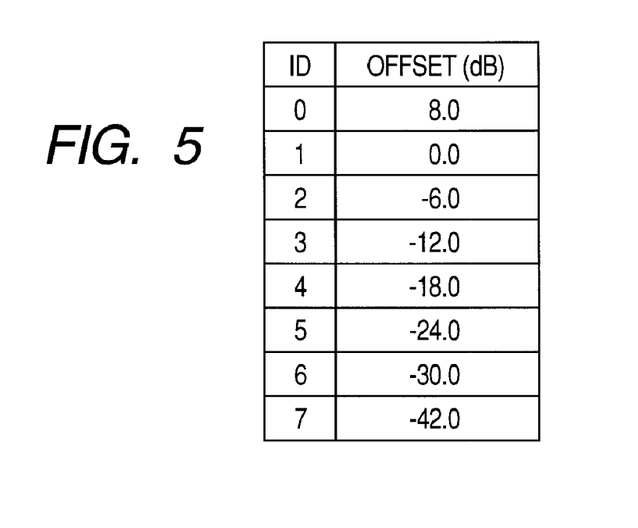
FIG. 5 shows an example of high-frequency gain offset information in a high-frequency gain difference information generating circuit in a signal encoding device.

Herein, when the low-frequency reference value information is calculated according to Equation (5) shown above, the high-frequency gain difference information in the first high-frequency subband may increase. Therefore, it is preferable to acquire the difference value through the high-frequency gain offset information common to each group so as to improve the encoding efficiency. As shown in the example of FIG. 5, the high-frequency gain offset information can be represented in bits of table. For example, when the difference values of the first to third groups 33 to 35 are −20 dB, −16 dB, and −18 dB, respectively, the average value is −18 dB. Accordingly, the difference values of the high-frequency grouping gain information in the first high-frequency subband are represented in −2 dB, +2 dB, and 0 dB, respectively, by using the high-frequency gain offset information at ID=4 having a value closest to the average value. The selected high-frequency offset information is transmitted to the multiplexing circuit 20 and is used for generating the high-frequency grouping gain information at the decoder.

In FIG. 4, the high-frequency gain difference information 41 in the first group of the second high-frequency subband is subtracted from the high-frequency grouping gain information 38 in the first group of the first high-frequency subband and becomes the high-frequency gain difference information. The high-frequency gain difference information generating circuit 17 calculates the high-frequency gain difference information of each group and each subband as described above.

However, the method of acquiring the difference value of each group has an advantage in reducing the information amount, but the method also has a disadvantage in being weak at the variation of reduction reference value information at the encoder and the decoder. For example, a part of the subband signal may be missed due to the influence of the quantization error caused during encoding and decoding the low-frequency subband signal or depending on an upper limit of a given bit rate. In this case, the low-frequency reference value information is varied by each group.

Figure 6A:
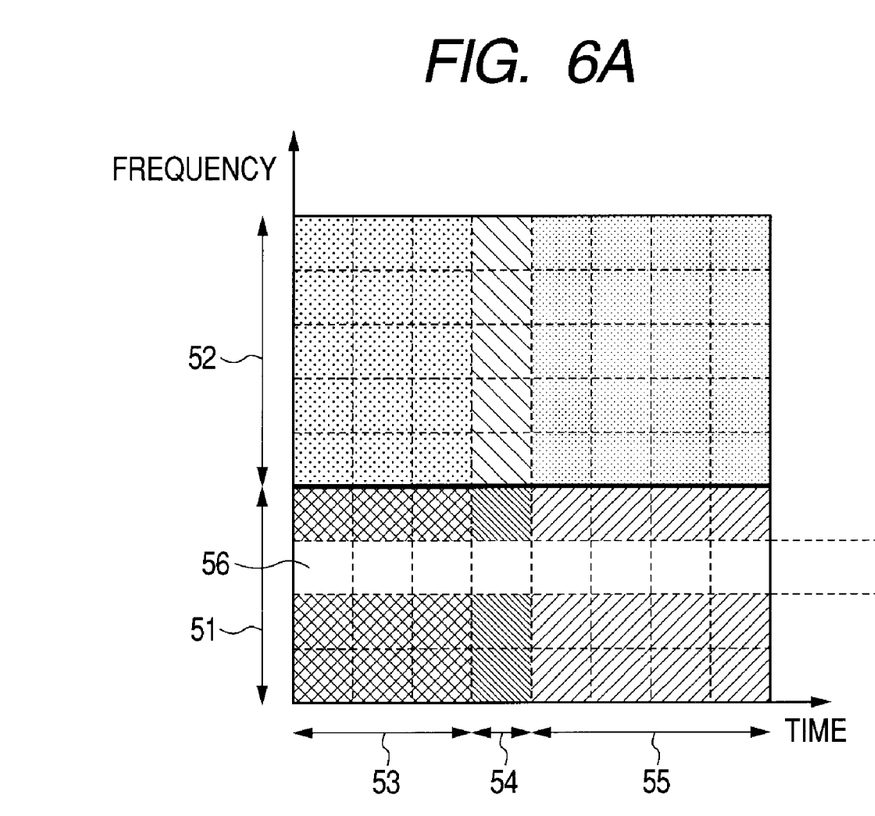
FIG. 6 shows a power spectrum of high-frequency gain information and a signal of each subframe and each subband of a frame when a part of a subband signal is missed.
Figure 6B:
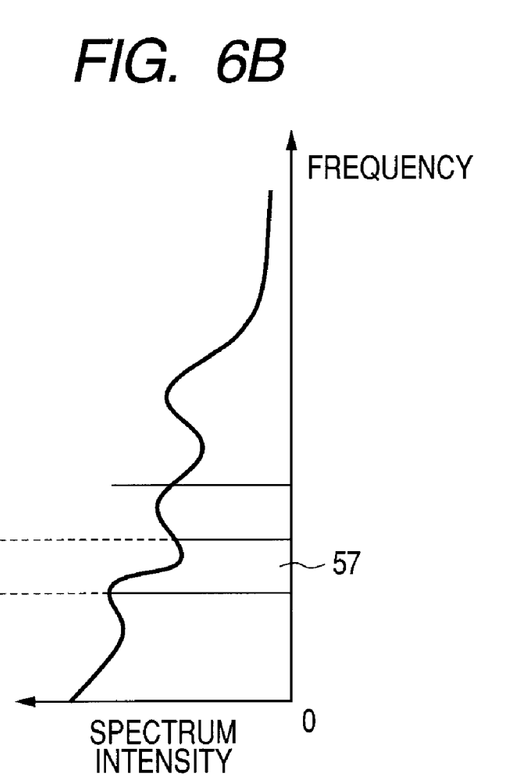

As described above, FIG. 6A shows high-frequency gain information of each subframe and each subband of a frame when the part of the subband signal is missed. In addition, FIG. 6B shows a power spectrum of a signal corresponding to FIG. 6B. In FIG. 6A, four subbands at the low-frequency side constitute a low-frequency subband 51 and five subbands at the high-frequency side constitute a high-frequency subband 52. In FIG. 6A, the information is grouped by three subframes, one subframe, and four subframes. Hereinafter, the groups shown in FIG. 6A are called a first group 53, a second group 54, and a third group 55, respectively.

When the number of given bits decreases and it is judged that a band 57 shown in FIG. 6B is not auditorily important, a subband 56 corresponding to the band 57 may be missed. In this case, when the low-frequency reference value is calculated by groups, the variation of the low-frequency reference value increases in the second group 54 including only one subframe. That is, an effect extent of the subband 56 is significantly different by each group.

It is necessary to compensate the high-frequency gain information of each group by calculating a variation extent at the encoder during the encoding and decoding of the low-frequency subband signal so as to prevent the variation of the low-frequency reference value. In this case, the encoder includes a low-frequency subband signal encoding device.

This is not preferable in an operation speed or a power consumption of the signal encoding device.

Therefore, the low-frequency reference value information generating circuit 16 may calculate one low-frequency reference value in the entire subband signal without using the high-frequency gain grouping information.

Figure 7:
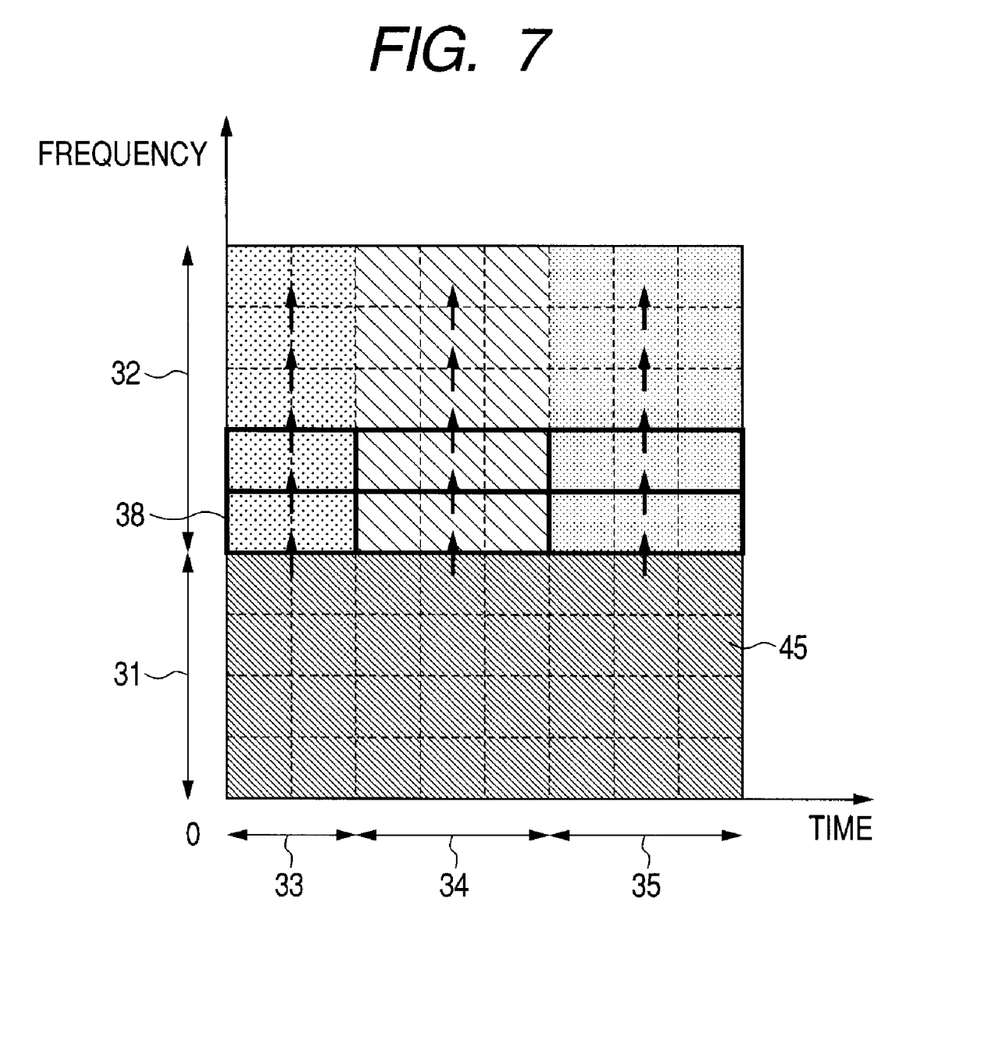
FIG. 7 shows another example of a method of acquiring low-frequency reference value information generated in a low-frequency reference value information generating circuit of a signal encoding device and a difference value in a high-frequency gain difference information generating circuit.

FIG. 7 shows the high-frequency gain information of each subframe and each subband of a frame in case of calculating one low-frequency reference value information in the entire low-frequency subband signal. In FIG. 7, four subbands at the low-frequency side constitute the low-frequency subband 31 and five subbands at the high-frequency side constitute the high-frequency subband 32, similar to FIG. 3. The information is grouped by the first group 33, the second group 34, and the third group 35, similar to FIG. 3.

In FIG. 7, the low-frequency reference value information generating circuit 16 calculates low-frequency reference value information 45 from the entire low-frequency subband signal. In addition, in the high-frequency gain difference information generating circuit 17, the high-frequency grouping gain information 38 in the first group of the first high-frequency subband is subtracted from the low-frequency reference value information 45 and become the high-frequency gain difference information. Similarly, the high-frequency gain difference information is calculated by using the same low-frequency reference value information 45 in the second group 34 and the third group 35.

As described above, the method of calculating one low-frequency reference value information in the entire low-frequency subband signal, the variation of the low-frequency reference value in each group becomes the same even in the case described in FIG. 6. Therefore, the relative relation of the gain of the high-frequency subband signal among the groups is maintained.

However, this method is not very preferable in the viewpoint of reducing the amount of the high-frequency gain information. For example, when an input signal has a pulse form, the first group 33 and the third group 35 may have a small gain, and the second group 34 may have a large gain. However, in this case, the difference value between the low-frequency reference value information 45 and each group in the first high-frequency subband is very large values such as, for example, −20 dB, +10 dB, and −20 dB. In case of the encoding by using the variable-length code, the length of the code is considerably increased.

In the method of calculating the low-frequency reference value information by each group by using the high-frequency gain grouping information, the high-frequency gain grouping information is not used. The method of calculating one low-frequency reference value information in the entire low-frequency subband signal without using the high-frequency gain grouping information has both the advantage and the disadvantage.

The low-frequency reference value information generating circuit 16 adaptively selects a method of generating the low-frequency reference value information on the basis of the nature of the input signal, that is, whether to calculate the low-frequency reference value information of each group or to calculate one low-frequency reference value information in the entire low-frequency subband signal. More specifically, the reference value information generating circuit 16 adaptively selects the method of generating the low-frequency reference value information in consideration of the quantization error of the low-frequency subband signal, a timely variation of a specific high-frequency subband signal or the entire high-frequency subband, and a difference in the code amounts of both methods.

More specifically, in case of selecting the method of generating the low-frequency reference value in consideration of the quantization error of the low-frequency subband signal, the quantization error can be estimated from a bit assignment amount of each low-frequency subband signal. Therefore, when it is judged that the power is considerably varied in the specific subband as shown in FIG. 6, the low-frequency reference value selection information is determined to calculate the low-frequency reference value information from the entire low-frequency subband signal as shown in FIG. 7. On the contrary, when the variation in power of the each subband is in the range of a threshold value, the low-frequency reference value selection information is determined to calculate the low-frequency reference value information by each group in the low-frequency subband signal as shown in FIG. 4.

In case of selecting the method of generating the low-frequency reference value in consideration of the timely variation of a specific high-frequency subband signal or the entire high-frequency subband signal, for example, when the timely variation increases, the low-frequency reference value information is calculated by each group. On the contrary, when the timely variation decreases, one low-frequency reference value information is calculated in the entire low-frequency subband signal. This method is very suitable for a small-sized circuit of the signal encoding device.

In the signal encoding device having a large-sized circuit, both of two generating methods shown in FIG. 4 and FIG. 7 are performed. Therefore, one method having the smaller final code amount of high-frequency subband signal gain difference information encoding data may be selected.

The low-frequency reference value selection information may be determined by comprehensively judging the method in which the quantization error of the low-frequency subband signal, or the timely variation of the specific high-frequency subband signal or the entire high-frequency subband signal is considered, and the method in which the difference in code amount of the specific high-frequency subband signal and the entire high-frequency subband signal is considered.

In the method of calculating the low-frequency reference value information, the optimal method can be selected in consideration of a desired tone quality, a circuit size of the signal encoding device, or the like.

Figure 8:
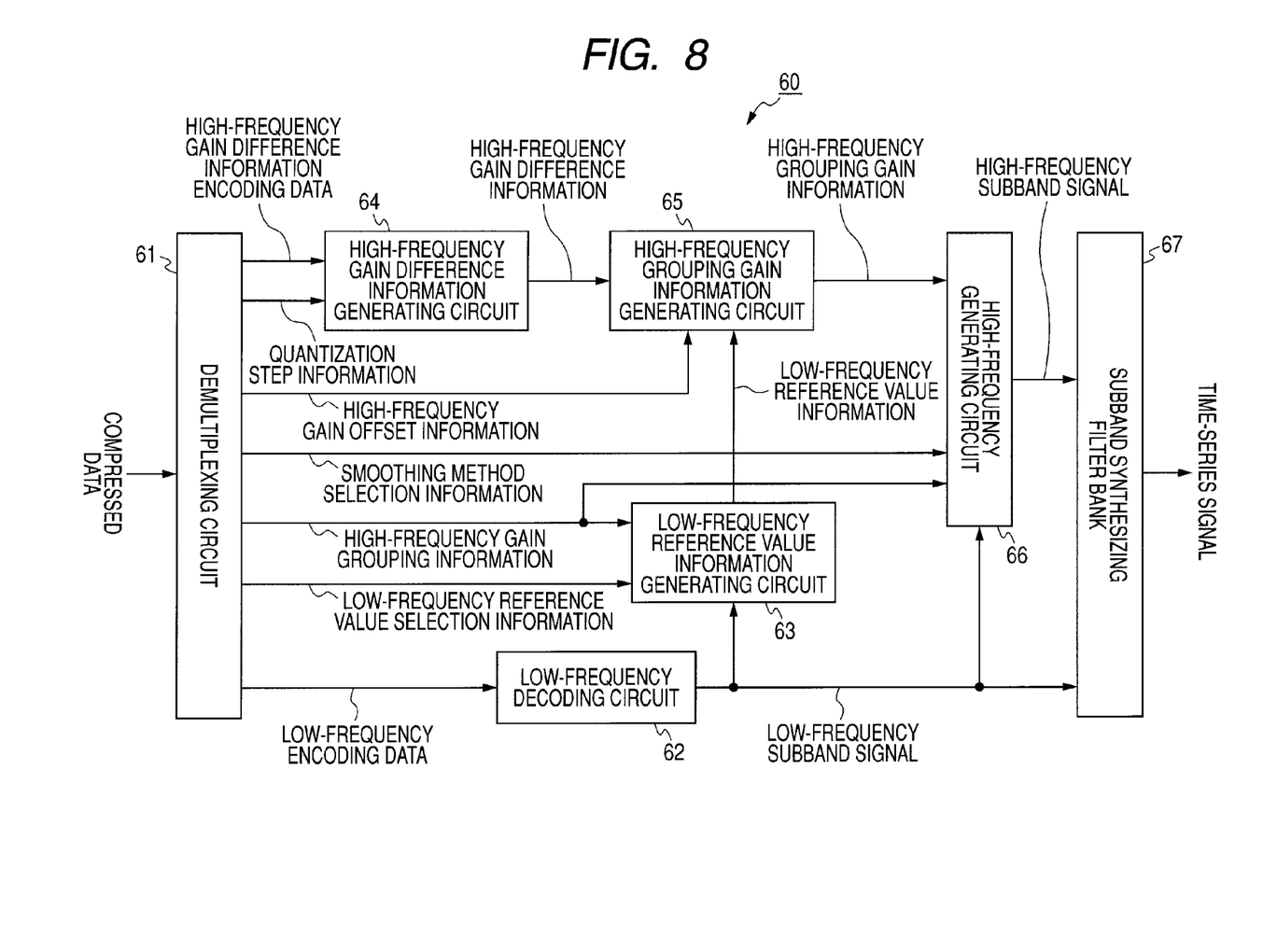
FIG. 8 is a schematic view for a configuration of a signal decoding device according to an embodiment of the invention.

Next, FIG. 8 is a schematic view of a signal decoding device according to this embodiment of the invention. As shown in FIG. 8, a signal decoding device 60 of this embodiment includes a demultiplexing circuit 61, a low-frequency decoding circuit 62, a low-frequency reference value information generating circuit 63, a high-frequency gain difference information generating circuit 64, a high-frequency grouping gain information generating circuit 65, a high-frequency generating circuit 66, and a subband synthesizing filter bank 67.

The demultiplexing circuit 61 demultiplexes an input compressed data and provides the low-frequency encoding data to the low-frequency decoding circuit 62. The demultiplexing circuit 61 provides the high-frequency gain difference information encoding data and the quantization step information to the high-frequency gain difference information generating circuit 64, and provides the smoothing method selection information to the high-frequency generating circuit 66. The demultiplexing circuit 61 provides the high-frequency gain grouping information to the low-frequency reference value information generating circuit 63 and the high-frequency generating circuit 66, and provides the low-frequency reference value selection information to the low-frequency reference value information generating circuit 63. When the compressed data includes the high-frequency gain offset information, the demultiplexing circuit 61 provides the information to the high-frequency grouping gain information generating circuit 65.

The low-frequency decoding circuit 62 decodes and unquantizes the low-frequency encoding data, and provides the low-frequency subband signals which are the signals of plural low-frequency subbands to the low-frequency reference value information generating circuit 63, the high-frequency generating circuit 66, and the subband synthesizing filter bank 67.

The low-frequency reference value information generating circuit 63 generates the low-frequency reference value information similar as the encoder on the basis of the low-frequency subband signal, the high-frequency gain grouping information, and the low-frequency reference value selection information, and provides the generated low-frequency reference value information to the high-frequency grouping gain information generating circuit 65.

The high-frequency gain difference information generating circuit 64 decodes and unquantizes the high-frequency gain difference information encoding data on the basis of the quantization step information, and generates the high-frequency gain difference information. The high-frequency gain difference information generating circuit 64 provides the generated high-frequency gain difference information to the high-frequency grouping gain information generating circuit 65.

The high-frequency grouping gain information generating circuit 65 generates the high-frequency gain information on the basis of the high-frequency gain difference information and the low-frequency reference value information, and as necessary the high-frequency gain offset information. The high-frequency grouping gain information generating circuit 65 provides the generated high-frequency gain information to the high-frequency generating circuit 66.

The high-frequency generating circuit 66 generates the high-frequency subband signal on the basis of the low-frequency subband signal, the high-frequency gain information, the smoothing method selection information, and the high-frequency gain grouping information, and provides the generated high-frequency subband signal to the subband synthesizing filter bank 67. More specifically, the high-frequency generating circuit 66 generates the high-frequency subband signal in a same method as the method described in FIG. 2 and Equations (1) to (3) described above.

Figure 9:
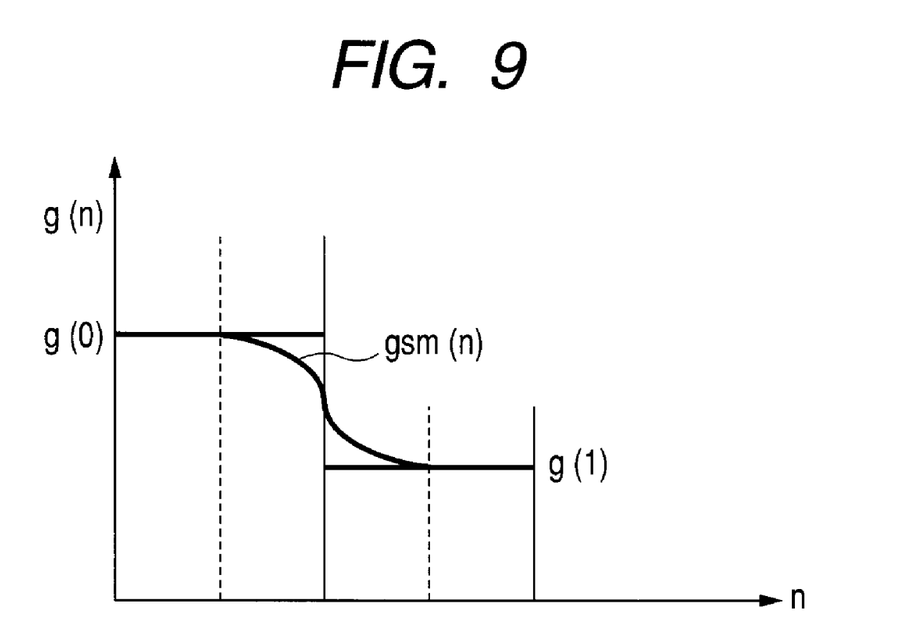
FIG. 9 shows an example the smoothing in a high-frequency generating circuit of a signal decoding device.

However, when a smoothing method at a time axis is designated by the smoothing method selection information, the high-frequency generating circuit 66 smoothes the high-frequency gain information on the basis of the smoothing method selection information. For example, when a smoothing performed by a sinewave function is designated, the smoothing is performed as shown in FIG. 9. In FIG. 9, when the gain control values of the first subframe and the second subframe in a high-frequency subband are g(0) and g(1), respectively, a smoothing function gsm(n) is acquired according to Equations (7) to (9) shown below.

$$gsm(n) = gsm\_a * \cos(n) + gsm\_b \quad (7)$$

$$gsm\_a = (g(0) - g(1))/2 \quad (8)$$

$$gsm\_b = (g(0) + g(1))/2 \quad (9)$$

The high-frequency generating circuit 66 generates the high-frequency subband signal according to Equation (10) shown below instead of Equation (2) by using the smoothing function gsm(n) acquired as described above.

$$xag(n) + gsm(n) * xa(n) \quad (10)$$

By this method, the smoothing at the time axis is similarly performed with all the subframes and subbands.

Referring back to FIG. 8, the subband synthesizing filter bank 67 synthesizes the low-frequency subband signal and the high-frequency subband signal, and outputs the acquired time-series signal.

As described above, in the signal encoding device 10 and the signal decoding device 60 according to this embodiment of the invention, it is possible to minimalize a disadvantage in acquiring the difference value of the high-frequency gain information and improve the encoding efficiency. Especially, in the signal encoding device 10 and the signal decoding device 60 according to this embodiment of the invention, since the difference value between the high-frequency gain information in the lowest-frequency subband in the high-frequency subband signal and the low-frequency reference value information is acquired, the absolute value is not generated in the frame. Moreover, the gain of the high-frequency subband signal is generally acquired from the low-frequency reference value information generated on the basis of the low-frequency subband signal, the balance in timely variation of the high-frequency subband signal and the low-frequency subband signal is excellent. Therefore, the time-series signal having very little confliction can be generated after the subbands are synthesized.

The embodiments of the invention are not limited only to the above-mentioned embodiments, but the embodiment of the invention can be variously changed within the range not contrary to the gist of the invention.

For example, in the embodiment described above, the method of generating the high-frequency subband signal from the low-frequency subband signal by using the frequency aliasing method. However, the method of generating the high-frequency subband signal from the low-frequency subband signal is not limited to the frequency aliasing method. Therefore, for example, a frequency shift method described in U.S. Pat. No. 466,730 may be used as the method of generating the high-frequency subband signal from the low-frequency subband signal.

The embodiment described above is described by using the configuration of hardware, but the embodiment is not limited to the configuration of the hardware. An optical process can be performed by executing a computer program with a CPU (Central Processing Unit). In this case, the computer program which is stored in a recording medium may be provided. In addition, the computer program may be provided through transmission media including Internet.

It should be understood by those skilled in the art that various modifications, combinations, sub-combinations and alternations may occur depending on design requirements and other factors insofar as they are within the scope of the appended claims or the equivalents thereof.

What is claimed is:

1. A signal encoding device for encoding a time-series signal, comprising:
   a partitioning section which partitions the time-series signal into plural subbands to generate a low-frequency subband signal including plural low-frequency subbands and a high-frequency subband signal including plural high-frequency subbands;
   a low-frequency encoding section which quantizes and encodes the low-frequency subband signal to generate low-frequency encoding data;
   a high-frequency gain information generating section which generates high-frequency gain information by generating a new high-frequency subband signal from the low-frequency subband signal and comparing the new high-frequency subband signal and the high-frequency subband signal of each subband;
a high-frequency gain difference information generating section which generates high-frequency gain difference information by acquiring a difference value between the high-frequency gain information generated in each subband;
a high-frequency gain difference information encoding section which quantizes and encodes the high-frequency gain difference information to generate high-frequency gain difference information encoding data; and
a multiplexing section which multiplexes at least the low-frequency encoding data and the high-frequency gain difference information encoding data to output the multiplexed data as compressed data.

2. A method of encoding a time-series signal, comprising:
partitioning the time-series signal into plural subbands in a partitioning section of an encoding device to generate a low-frequency subband signal including plural low-frequency subbands and a high-frequency subband signal including plural high-frequency subbands;
quantizing and encoding the low-frequency subband signal in a low-frequency encoding section to generate low-frequency encoding data;
generating high-frequency gain information in a high-frequency gain information generating section by generating a new high-frequency subband signal from the low-frequency subband signal and comparing the new high-frequency subband signal and the high-frequency subband signal of each subband;
generating high-frequency gain difference information in a high-frequency gain difference information generating section by acquiring a difference value between the high-frequency gain information generated in each subband;
quantizing and encoding the high-frequency gain difference information in a high-frequency gain difference information encoding section to generate high-frequency gain difference information encoding data; and
multiplexing at least the low-frequency encoding data and the high-frequency gain difference information encoding data in a multiplexing section to output the multiplexed data as compressed data.

3. A signal encoding device for encoding a time-series signal, with logic programmed to:
partition the time-series signal into plural subbands to generate a low-frequency subband signal including plural low-frequency subbands and a high-frequency subband signal including plural high-frequency subbands;
quantize and encode the low-frequency subband signal to generate low-frequency encoding data;
generate high-frequency gain information by generating a new high-frequency subband signal from the low-frequency subband signal and comparing the new high-frequency subband signal and the high-frequency subband signal of each subband;
generate high-frequency gain difference information by acquiring a difference value between the high-frequency gain information generated in each subband;
quantize and encode the high-frequency gain difference information to generate high-frequency gain difference information encoding data; and
multiplex at least the low-frequency encoding data and the high-frequency gain difference information encoding data to output the multiplexed data as compressed data.

4. A tangible computer readable medium on which is stored a computer program, which when executed in a logic processing device, performs the following steps to encode a time-series signal:
partitioning the time-series signal into plural subbands in a partitioning section to generate a low-frequency subband signal including plural low-frequency subbands and a high-frequency subband signal including plural high-frequency subbands;
quantizing and encoding the low-frequency subband signal in a low-frequency encoding section to generate low-frequency encoding data;
generating high-frequency gain information in a high-frequency gain information generating section by generating a new high-frequency subband signal from the low-frequency subband signal and comparing the new high-frequency subband signal and the high-frequency subband signal of each subband;
generating high-frequency gain difference information in a high-frequency gain difference information generating section by acquiring a difference value between the high-frequency gain information generated in each subband;
quantizing and encoding the high-frequency gain difference information in a high-frequency gain difference information encoding section to generate high-frequency gain difference information encoding data; and
multiplexing at least the low-frequency encoding data and the high-frequency gain difference information encoding data in a multiplexing section to output the multiplexed data as compressed data.

5. A signal decoding device for decoding compressed data, the device comprising:
a demultiplexing section which demultiplexes the compressed data to generate low-frequency encoding data and high-frequency gain difference encoding data;
a low-frequency decoding section which decodes and unquantizes the low-frequency encoding data to generate low-frequency subband signal;
a high-frequency gain difference information generating section which generates high-frequency gain difference information of each subband and unquantizes the high-frequency gain difference information encoding data;
a high-frequency gain information generating section which generates high-frequency gain information on the basis of high-frequency gain difference information;
a high-frequency generating section which generates the high-frequency subband signal from the low-frequency subband signal and controlling the gain of the high-frequency subband signal on the basis of the high-frequency gain information; and
a synthesizing section which synthesizes the low-frequency subband signal and the high-frequency subband signal having a controlled gain to output the synthesized signals as a time-series signal.

6. A method of decoding compressed data, the method comprising:
demultiplexing the compressed data in a demultiplexing section of a decoding device to generate low-frequency encoding data and high-frequency gain difference encoding data;
decoding and unquantizing the low-frequency encoding data in a low-frequency decoding section to generate low-frequency subband signal;
generating high-frequency gain difference information of each subband and unquantizing the high-frequency gain difference information encoding data in a high-frequency gain difference information generating section;
generating high-frequency gain information on the basis of high-frequency gain difference information in a high-frequency gain information generating section;
generating the high-frequency subband signal from the low-frequency subband signal and controlling the gain of the high-frequency subband signal on the basis of the high-frequency gain information in a high-frequency generating section; and
synthesizing the low-frequency subband signal and the high-frequency subband signal having a controlled gain in a synthesizing section to output the synthesized signals as a time-series signal.

7. A signal decoding device for decoding compressed data, the device having logic programmed to:
demultiplex the compressed data to generate low-frequency encoding data and high-frequency gain difference encoding data;
a decode and unquantize the low-frequency encoding data to generate low-frequency subband signal;
generate high-frequency gain difference information of each subband and unquantizes the high-frequency gain difference information encoding data;
generate high-frequency gain information on the basis of high-frequency gain difference information;
generate the high-frequency subband signal from the low-frequency subband signal and controlling the gain of the high-frequency subband signal on the basis of the high-frequency gain information; and
synthesize the low-frequency subband signal and the high-frequency subband signal having a controlled gain to output the synthesized signals as a time-series signal.

8. A tangible computer readable medium on which is stored a computer program, which when executed in a logic processing device, performs the following steps to decode compressed data:
demultiplexing the compressed data in a demultiplexing section to generate low-frequency encoding data and high-frequency gain difference encoding data;
decoding and unquantizing the low-frequency encoding data in a low-frequency decoding section to generate low-frequency subband signal;
generating high-frequency gain difference information of each subband and unquantizing the high-frequency gain difference information encoding data in a high-frequency gain difference information generating section;
generating high-frequency gain information on the basis of high-frequency gain difference information in a high-frequency gain information generating section;
generating the high-frequency subband signal from the low-frequency subband signal and controlling the gain of the high-frequency subband signal on the basis of the high-frequency gain information in a high-frequency generating section; and
synthesizing the low-frequency subband signal and the high-frequency subband signal having a controlled gain in a synthesizing section to output the synthesized signals as a time-series signal.

* * * * *